Oct. 29, 1940.    A. SIMONS    2,219,664

ROLLING MILL UNIT

Filed Feb. 8, 1937

INVENTOR
Abraham Simons
BY Mock & Blum
ATTORNEYS

Patented Oct. 29, 1940

2,219,664

UNITED STATES PATENT OFFICE 2,219,664

ROLLING MILL UNIT

Abraham Simons, New York, N. Y.

Application February 8, 1937, Serial No. 124,533

4 Claims. (Cl. 80—31.1)

My invention relates to a new and improved rolling mill unit.

One of the objects of my invention is to provide a mechanism which will embody improvements over that shown in application Ser. No. 58,631 filed by me in the United States Patent Office on March 12, 1936. Reference is made to said previously filed application for full details of the general invention, as the disclosure herein is confined to the specific improvements over the method and mechanism disclosed in said application Ser. No. 58,631.

Another object of my invention is to provide a device which will be extremely simple to manufacture and install, and which shall be uniform and reliable in operation.

Other objects of my invention will be set forth in the following description and drawing which illustrate a preferred embodiment thereof, it being understood that the above statement of the objects of my invention is intended generally to explain the same without limiting it in any manner.

The invention is applicable to the cold rolling of metal strip, such as steel strip or strip made of any other metal. It also applies to hot rolling.

The main object of the invention is to roll said strip so as to produce rolled strip of substantially uniform thickness and width, so that it will be unnecessary to trim the edges of the rolled strip for making various articles in which it is necessary to have metal strip of uniform width.

Figure 1:
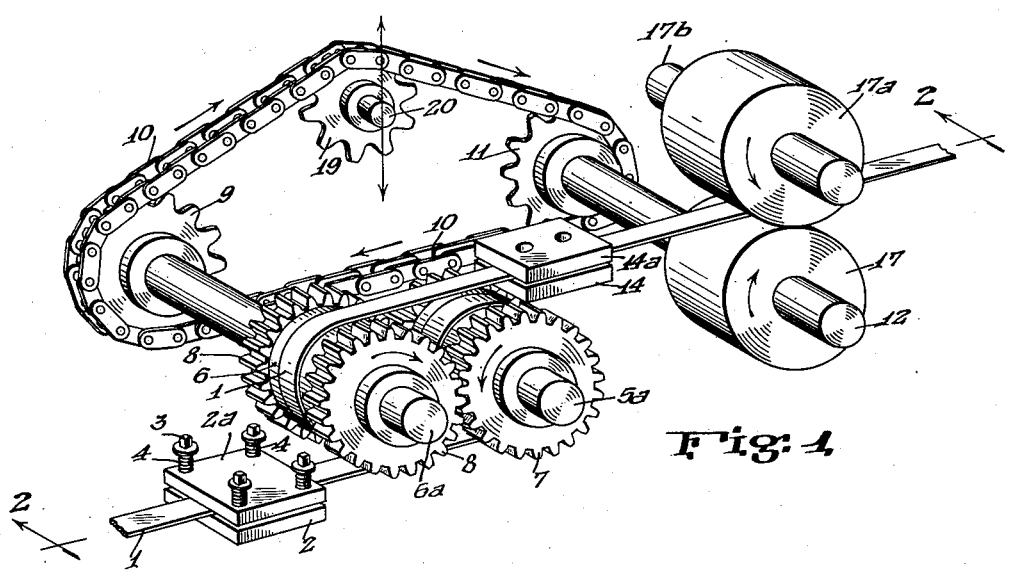
Fig. 1 is a perspective view illustrating the improved unit.

Referring to Fig. 1, the metal strip 1 is led from any suitable reel or other source, between metal plates 2 and 2a which are adjustably connected to each other by means of pins 3, having springs 4 mounted on the shanks of said pins. The pins 3 connect the metal plates 2 and 2a so that said plates can move relative to each other, and the springs 4 force said plates 2 and 2a towards each other with any desired regulated or adjustable force. Said pins 3 have removable heads which can be connected to said pins. The plates 2 and 2a have dry friction linings 16 and 16a made of leather or other suitable material, and they therefore act as an adjustable friction brake for retarding the feed of the metal strip 1.

Figure 2:
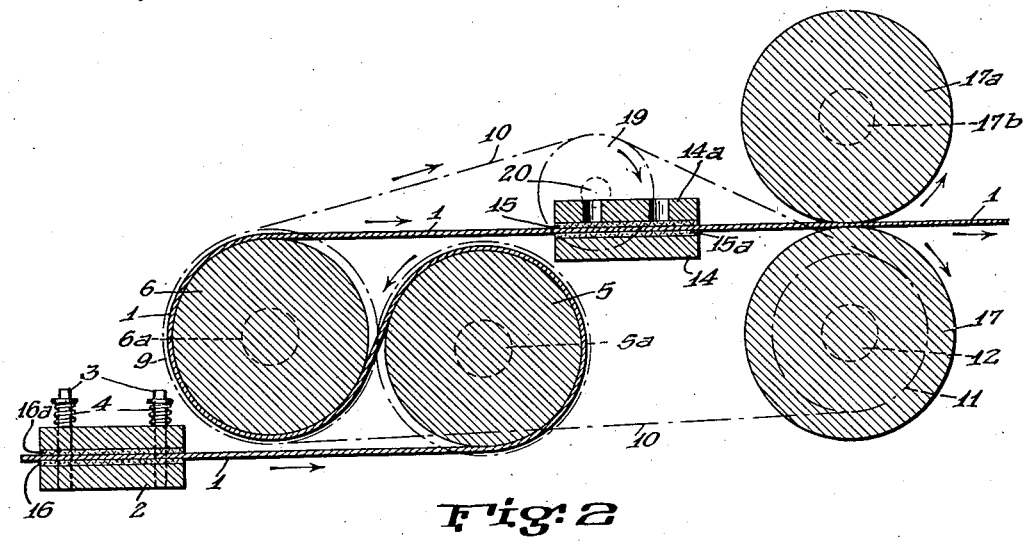
Fig. 2 is a sectional view on the line 2—2 of Fig. 2.

As shown in Fig. 2, the strip 1 is led around a first roll 5, and then under and around a second roll 6. These rolls 5 and 6 are mounted on shafts 5a and 6a and said shafts have pairs of intermeshing gears 7 and 8. The gears 7 may be fixed to the adjacent end faces of the roll 5, or, if desired, the gears 7 and the roll 5 could be integral. The gears 7 and the roll 5 can turn freely on the shaft 5a. If desired, gears 7 and roll 5 can be keyed to shaft 5a, which will turn in unison with said roll 5.

It will be noted that the gears 7 and 8 are provided on both sides of the rolls 5 and 6, in order to provide extremely positive and reliable means for causing said rolls to turn in unison. Said rolls 5 and 6 are of equal diameter although the invention is not to be limited to this relation. Said rolls turn at the same peripheral speed.

The roll 6 and the gears 8 are keyed to the shaft 6a. The shaft 6a is provided with a sprocket 9. An endless chain 10 meshes with the sprocket 9, and with a sprocket 11, which is mounted upon the shaft 12. The chain 10 clears the gears 7 and 8.

After the strip leaves the roll 6, it passes between a pair of plates 14 and 14a which do not exert a braking action upon the strip and merely lubricate the faces of the strip. The inner surfaces of the plates 14 and 14a are lubricated by any suitable lubricating medium such as oil or the like, so that the members 14 and 14a have little or no braking action.

The members 14 and 14a have their inner surfaces provided with a continuous supply of oil or other lubricant so that the faces of the metal strip 1 have films of lubricant thereon, after they leave the plates 14 and 14a. For this purpose, the plates 14 and 14a are provided with absorbent linings 15 and 15a. These linings may be made of felt so as to absorb a sufficient supply of oil or other liquid lubricant. The supply of lubricant may be renewed whenever necessary.

The lubricated strip now passes between the first rolling unit, which comprises the rolls 17 and 17a. The roll 17 is mounted upon and keyed or otherwise suitably secured to the shaft 12. The roll 17a is keyed to a shaft 17b.

The shafts shown herein are mounted in suitable bearings (not shown). The shaft 12 is driven from any suitable source of power and the shaft 17b can also be driven in unison with the shaft 12 by means of gears or according to standard rolling mill practice or design. These rolls 17 and 17a are of the same diameter and they are driven at the same speed. They may have different diameters, as long as they have the same peripheral speeds.

In order to provide for different ratios between the sprockets 9 and 11, the endless chain 10 meshes with an idler sprocket 19, which is mounted upon a vertically adjustable shaft 20. The vertical position of said shaft 20 can be regulated in order to allow for different ratios between the pitch diameters of sprockets 9 and 11. The sprocket 11 is smaller than the sprocket 9, so that the common peripheral speed of the retarding rolls 5 and 6 is ordinarily less than the common peripheral speed of the reducing rolls 17 and 17a.

Hence the stock or strip 1 is fed at exact and predetermined regulated speed towards the rolling unit or units and said speed is less than the linear speed of the peripheries of the rolls 17 and 17a.

The device shown can be readily applied as an attachment to any standard rolling mill. The stock is therefore retarded wholly anterior the first pair of mill rolls or pressing rolls. Behind the first pair of mill rolls, the stock is driven through the mill wholly by succeeding pairs of mill rolls.

By having a plurality of retarding rolls 5 and 6, the braking force of plates 2 and 2a will be multiplied in accordance with the number of retarding rolls. I can use more than two retarding rolls and they can be of diameters as large as is desired, in order to prevent any slipping of the stock relative to the retarding rolls.

The governed retarding of the speed of the stock depends upon the rate of reduction of the stock in the mill.

The mill can have any number of rolling units in addition to the first pair of rolls 17 and 17a.

It has heretofore been proposed to retard the feed of the stock towards the rolling mill, by means of a friction clamp. However, such clamp imposed only a slight frictional drag upon the stock, just enough to keep it straight anterior to the mill. Since the stock varies in thickness and hardness, a uniform braking effect could not be secured, of sufficient strength and uniformity and precision, to control the increase in width of the stock which is caused by the rolling.

In order to control the increase in width of the stock during the rolling thereof, it is necessary to supply the stock to the mill by means of feeding mechanism which has an operative feeding speed which must have an exact and constant ratio to the speed of the rolls. According to the invention, the feed of the stock can be regulated with great precision, so that the increase in width of the stock during the first pass and during subsequent passes can be kept as low as is desired, and the stock may even be rolled without increasing its width. By keeping the increase in width of the stock sufficiently small, during the rolling, the rolled stock has substantially uniform edges and it is of substantially uniform width. Likewise, the "crowning" of the rolled stock can be substantially eliminated, so that the rolled stock has flat planar faces, instead of having arched faces. The slight frictional drag of plates 2 and 2a can be multiplied as much as is desired by having two or more retarding rolls of sufficiently large diameter. In the embodiment shown, the strip contacts with about three-fourths of the periphery of each retarding roll. If the strip is made of steel, the retarding rolls may be made of cast iron, and the peripheries of said retarding pulleys may have a thin layer of cork or the like, and I may use other means which are used in connection with steel belts, in order to prevent any slipping between the metal strip and the retarding rolls. Since the retarding rolls are driven positively from the rolling mill, a fluctuation in the braking effect of plates 2 and 2a, due to differences in hardness and thickness of the metal strip, will not affect the uniformity of the feed of the stock towards the rolling mill, since the force which is applied to the retarding rolls by sprocket 9 is much greater than the braking force of plates 2 and 2a.

Even if there is a quick drop in the braking force of the plates 2 and 2a, the metal strip will not slip relative to the retarding rolls, because said strip is bent around a sufficient number of retarding rolls in the manner shown, so as to prevent any substantial slipping. It requires some force to bend the metal strip around the retarding rolls, and this resistance to bending creates a retarding frictional force, so as to prevent any slipping of the stock relative to the rolls, even if the retarding effect of plates 2 and 2a is very small.

By using a sufficient number of retarding rolls, the braking device 2 and 2a can even be eliminated, since the bending of the strip around the rolls will supply the necessary drag. In such embodiment, the rolls which are anterior to the last roll, constitute retarding means.

Likewise, the pressure of plates 2 and 2a can be adjusted so as to provide a frictional drag which will not drop below a certain minimum, because the positive drive of the retarding rolls from the rolling mills will be greatly in excess of any increase in the braking force, due to irregularity in the metal strip. The use of a chain and sprockets is merely illustrative of any suitable positive and invariable drive between the retarding rolls (or other movable retarding means) and the rolling mill. Various mechanical drives for this purpose could be utilized. Said mechanical drives can be designated as toothed means, because they consist of gears and a chain which do not permit any slip. Any common drive could be used for the mill and for the retarding roll or rolls, if the force of the drive exceeded the drag of the retarding roll or rolls, as regulated by the anterior braking device, if such device is used.

The peripheries of rolls 5 and 6 may be sufficiently close to each other, so as to exert pressure on the strip between said rolls. Said pressure can be sufficient further to make the strip move in unison with the rolls, but without diminishing the thickness of the strip.

I have shown a preferred embodiment of my invention, but it is clear that numerous changes and omissions can be made without departing from its spirit.

I claim:

1. In combination with a rolling mill having reducing rolls, a retarding roll over which the stock is adapted to be led in curved form, said retarding roll being located anterior to the mill, toothed means actuating said retarding roll simultaneously with said reducing rolls so that the peripheral speed of said retarding roll is uniform and less than the peripheral speed of said reducing rolls, and supplemental retarding means anterior to said retarding roll, said stock being actuated behind the first pair of reducing rolls, wholly by succeeding reducing rolls.

2. In combination with a rolling mill having reducing rolls, a plurality of retarding rolls located wholly anterior to the reducing rolls of said mill, a friction brake anterior to the retarding rolls, said retarding rolls being located so that a metal strip which passes through said friction brake can be bent in opposite directions around said retarding rolls and then be led to said reducing rolls, toothed means actuating said retarding rolls at the same peripheral speed and simultaneously with said reducing rolls, the peripheral speed of said retarding rolls being less than the peripheral speed of the reducing rolls, said stock being actuated behind the first pair of reducing rolls, wholly by succeeding reducing rolls.

3. An attachment for a rolling mill having driven reducing rolls which are mounted on shafts, said attachment comprising a plurality of retarding rolls located wholly anterior the first pair of reducing rolls of said mill, said retarding rolls being located so that the stock is led around said retarding rolls in curved form, toothed drive means operated from the shaft of the first pair of reducing rolls and operating said retarding rolls at the same peripheral speed, said peripheral speed being less than the peripheral speed of the first pair of reducing rolls, and a friction device anterior said reducing rolls, said stock being actuated behind the first pair of reducing rolls, wholly by succeeding reducing rolls.

4. In combination with and anterior a rolling mill which has reducing rolls, retarding means adapted to retard the movement of the stock, rotary means located wholly intermediate the first reducing rolls and said retarding means, said rotary means being shaped to contact with the stock and to press against the stock so as to create sufficient friction between the stock and said rotary means to prevent any substantial slip between the stock and the rotary means, said rotary means being located so that the stock contacts in curved form with said rotary means and common toothed drive means for said rotary means and said reducing rolls and adapted to operate said rotary means simultaneously with said rolls and at a lower peripheral speed than said rolls, said stock being actuated behind the first pair of reducing rolls, wholly by succeeding reducing rolls.

ABRAHAM SIMONS.